(12) United States Patent
Prada Peyser et al.

(10) Patent No.: US 8,620,806 B2
(45) Date of Patent: Dec. 31, 2013

(54) MERCHANT DATA CLEANSING IN CLEARING RECORD

(75) Inventors: Ana Paula Martinez Prada Peyser, Key Biscayne, FL (US); Bruce William Mac Nair, Stamford, CT (US); Cristobel Kay von Walstrom, Greenwich, CT (US); Gary Randall Horn, O'Fallon, MO (US); Jason Alexander Korosec, Morgan Hill, CA (US); Kimberly Ann Martin, Maryville, IL (US); Peter Julian Ramon Antonio R. Flor, O'Fallon, MO (US); Raegen Ann-Marie Lang, Fairview Heights, IL (US); Richard Thomas Flynn, Definace, MO (US); Todd C. Lowenberg, Redding, CT (US); Thomas Joseph Sellner, Dardenne Prairie, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/548,983

(22) Filed: Jul. 13, 2012

(65) Prior Publication Data

US 2013/0018781 A1    Jan. 17, 2013

Related U.S. Application Data

(60) Provisional application No. 61/507,414, filed on Jul. 13, 2011, provisional application No. 61/565,362, filed on Nov. 30, 2011.

(51) Int. Cl.
G06Q 40/00    (2012.01)
G06Q 40/02    (2012.01)

(52) U.S. Cl.
CPC .................................. *G06Q 40/025* (2013.01)
USPC .......................................................... 705/39

(58) Field of Classification Search
CPC ................................................... G06Q 40/025
USPC .......................................................... 705/39
See application file for complete search history.

(56) References Cited

U.S. PATENT DOCUMENTS

| 5,692,132 | A | 11/1997 | Hogan | |
|---|---|---|---|---|
| 2003/0140007 | A1 | 7/2003 | Kramer et al. | |
| 2004/0215543 | A1* | 10/2004 | Betz et al. | 705/35 |
| 2008/0086365 | A1* | 4/2008 | Zollino et al. | 705/10 |
| 2011/0238581 | A1 | 9/2011 | Severson et al. | |

* cited by examiner

*Primary Examiner* — Eric T Wong
(74) *Attorney, Agent, or Firm* — Hoffmann & Baron, LLP

(57) ABSTRACT

A network operator intermediates a cashless transaction by sending a payment device issuer an outbound clearing data file enriched with cleansed merchant data. Issuers that choose to participate in the merchant data cleansing service will be provided with the cleansed, and optionally augmented, merchant information. Providing this data to the issuer could be used to help reduce costs associated with "do not recognize" calls by cardholders, disputed charges, and charge-backs. With cleansed data provided in the clearing record, a device holder would be given access to this cleansed information about the merchant where a transaction took place through their statement. The present disclosure also provides for augmenting the clearing record data to include merchant-specific add-on and/or aggregate data not presently included in the transaction clearing record, yet useful to the issuer both in form and content.

39 Claims, 6 Drawing Sheets

MERCHANT DATA CLEANSING IN CLEARING RECORD

CROSS-REFERENCE TO RELATED APPLICATIONS

This application claims the priority benefit under 35 U.S.C. §119(e) of prior U.S. Provisional Patent Application Ser. No. 61/507,414, filed 13 Jul. 2011, and also of prior U.S. Provisional Patent Application Ser. No. 61/565,362, filed 30 Nov. 2011. The complete disclosures of these prior applications are hereby incorporated by this reference in their entirety for all purposes.

BACKGROUND

1. Field of the Disclosure

The present disclosure relates to electronic transaction processing. More specifically, the present disclosure is directed to method and system for providing standardized or cleansed data identifying the merchant involved in a transaction as part of the clearing record of that transaction.

2. Brief Discussion of Related Art

The use of payment devices for a broad spectrum of cashless transactions has become ubiquitous in the current economy, accounting for hundreds of billions of dollars in transactions during 2010 alone. The process and parties involved can be visualized for example as presented in FIG. 1, and can be thought of as a cycle, as indicated by arrow 10. A device holder 12 may present a payment device 14 to a merchant 16 as payment for goods and/or services. For simplicity the payment device 14 is depicted as a credit card, although those skilled in the art will appreciate the present disclosure is equally applicable to any cashless payment device, for example and without limitation contactless RFID-enabled devices including smart cards, NFC-enabled smartphones, electronic mobile wallets or the like. The payment device 14 here is emblematic of any transaction device, real or virtual, by which the device holder 12 as payor and/or the source of funds for the payment may be identified.

In cases where the merchant 16 has an established merchant account with an acquiring bank (also called the acquirer) 20, the merchant communicates with the acquirer to secure payment on the transaction. An acquirer 20 is a party or entity, typically a bank, which is authorized by the network operator 22 to acquire network transactions on behalf of customers of the acquirer 20 (e.g., merchant 16). Occasionally, the merchant 16 does not have an established merchant account with an acquirer 20, but may secure payment on a transaction through a third-party payment provider 18. The third party payment provider 18 does have a merchant account with an acquirer 20, and is further authorized by the acquirer 20 and the network operator 22 to acquire payments on network transactions on behalf of sub-merchants. In this way, the merchant 16 can be authorized and able to accept the payment device 14 from a device holder 12, despite not having a merchant account with an acquirer 20.

The acquirer 20 routes the transaction request to the network operator 22. The data included in the transaction request will identify the source of funds for the transaction. With this information, the network operator routes the transaction to the issuer 24. An issuer 24 is a party or entity, typically a bank, which is authorized by the network operator 22 to issue payment cards 14 on behalf of its customers (e.g., device holder 12) for use in transactions to be completed on the network. The issuer 24 also provides the funding of the transaction to the network provider 22 for transactions that it approves in the process described. The issuer 24 may approve or authorize the transaction request based on criteria such as a device holder's credit limit, account balance, or in certain instances more detailed and particularized criteria including transaction amount, merchant classification, etc., which may optionally be determined in advance in consultation with the device holder and/or a party having financial ownership or responsibility for the account(s) funding the payment device 14, if not solely the device holder 12.

The issuer 24 decision to authorize or decline the transaction is routed through the network operator 22 and acquirer 20, ultimately to the merchant 16 at the point of sale. This entire process is typically carried out by electronic communication, and under routine circumstances (i.e., valid device, adequate funds, etc.) can be completed in a matter of seconds. It permits the merchant 16 to engage in transactions with a device holder 12, and the device holder 12 to partake of the benefits of cashless payment, while the merchant 16 can be assured that payment is secured. This is enabled without the need for a preexisting one-to-one relationship between the merchant 16 and every device holder 12 with whom they may engage in a transaction.

The authorization may also be separate in time from the consumption of the transaction. In some cases, an authorization will be taken by a merchant 16, but payment is not made until goods are delivered or the services performed some time later. In any case, on a periodic basis, e.g., daily, the merchant 16 will submit a batch of completed and authorized transactions to the acquirer 20 to receive payment. The acquirer will in turn look to the network operator for payment in a process called "clearing". The clearing records, or list of cleared transactions including data relevant thereto in form and content specified by the network operator 22, is transmitted to the issuer 24.

The issuer 24 may then look to its customer, e.g., device holder 12 or other party having financial ownership or responsibility for the account(s) funding the payment device 14, for payment on approved transactions, for example through an existing line of credit where the payment device 14 is a credit card, or from funds on deposit where the payment device 14 is a debit card. The issuer 24 will prepare a periodic statement 26 listing transactions on the account of a device holder 12, including merchant data as provided by the network operator 22.

One problem that arises is poor quality of the data received from an acquirer 20, particularly where the merchant 16 is separated from the acquirer 20 by a third party payment provider 18. An estimated 13-14 MM dispute cases are opened each year, where the device holder 12 Does Not Recognize (or "DNR") the merchant 16 listed on their billing statement 26. At an industry average of $25 per claim, case resolution costs the industry approximately $350 MM per year.

These estimates do not include the call center costs of the initial phone call from the device holder 12, call time with a dispute specialist prior to opening the case, and write-offs undertaken by the issuer 24 when the transaction amount does not reach a certain threshold. Therefore, improvement in merchant data quality will further be of tangible benefit to customer-service call centers involved in cashless transaction processing by reducing the number of calls and their associated costs, regardless of which entity on the transaction processing chain is operating the call center (including third-party outsourced providers).

Furthermore, improvement in merchant data quality will be of benefit to the acquirers 20 where they do not have direct control over the merchant data quality, for example in the cases where the merchant 16 is separated from the acquirer 20 by a third party payment provider 18. For example, improvement in data quality may facilitate processing return authorization messages received from the network operator 20, or in their settlement clearing of processed transactions.

In addition to the above-described benefits, among others, to the various parties to the processing of the cashless transaction according to the instant disclosure, valuable benefits accrue to the network operator 20 as well. The network operator may see its own call center costs reduced corresponding with the number of DNRs. In addition, reduced DNRs may lead to reduced chargeback requests, which necessarily interrupt the ordinary transaction flow and are a source of dissatisfaction to merchants 16, among others. The improvement of service level to all involved in the cashless transaction chain according to the present disclosure further inures to the benefit of the network operator 20.

Some sources of poor merchant data quality include
Merchants 16 shift between acquirers 20;
Several merchants 16 may be partnered with multiple acquirers 20;
Merchant 16 DBA Name, City Name, and Address include non-standard abbreviation variations;
Acquirer 20 has a data integrity deficit identifying one or more merchants 16;
One or more acquirers 20 interpret the network operator's 22 reporting guidance differently from their peers; or
Acquirers 20 are not obligated to tell a network operator 22 when they make changes or reassign merchant identifiers.

Two main characteristics of "poor quality" merchant data are
1. Incomplete Information—Acquirers 20 leaving key data fields blank; and
2. Inaccurate Information—Wrong data supplied by acquirers 20 either by mistake or interpretation.

A solution to this apparent data deficit problem remains wanting.

SUMMARY

MasterCard International, the assignee of the instant application, in its capacity as network operator 22 in the above-described process has developed a solution to provide cleansed merchant data through the clearing records in a real-time manner. According to the present disclosure, the network operator 22 sends the issuer 24 an outbound clearing data file enriched with cleansed merchant data. Issuers 24 that choose to participate in the merchant data cleansing service will be provided with the cleansed, and optionally augmented, merchant information in First and Second Presentment messages on the Accepted outbound clearing files. Providing this data to the issuer 24 could be used to help reduce costs associated with "do not recognize" calls, disputed charges, and charge-backs. With cleansed data provided in the clearing record, a device holder 12 would presumably be given access to this additional cleansed information about the merchant 16 where a transaction took place through the statement 26.

Therefore, in order to overcome the aforementioned and other weaknesses, drawbacks, and deficiencies in the known art, provided according to the present disclosure is a method of intermediating cashless transactions from an acquirer involving a payment device issued by an issuer. According to the presently disclosed method, a network operator receives a transaction request from the acquirer on behalf of a merchant in a transaction clearing record. The transaction request includes data identifying the merchant and the payment device. The network operator compares the data identifying the merchant to a database including cleansed merchant data entries to determine if a match exists in the database.

In response to determining a match exists in the database between a cleansed merchant data entry and the data identifying the merchant in the transaction request, the network operator determines whether the data identifying the merchant in the transaction request should be substituted with the matching cleansed merchant data entry. Further, in response to determining that the data identifying the merchant should be substituted with the matching cleansed merchant data entry, the network operator performs the data substitution. The transaction request is forwarded to the issuer of the payment device.

Alternately or additionally, the network operator may compare the data identifying the merchant to a database including merchant add-on data entries to determine if a match exists in the database. In response to determining a match exists in the database between a merchant add-on data entry and the data identifying the merchant in the transaction request, the network operator may append the merchant add-on data entry to the transaction request before forwarding the transaction request to the issuer of the payment device.

Alternately or additionally, the network operator may compare the data identifying the merchant to a database including merchant aggregation data entries to determine if a match exists in the database. In response to determining a match exists in the database between a merchant aggregation data entry and the data identifying the merchant in the transaction request, the network operator may append the merchant aggregation data entry to the transaction request before forwarding the transaction request to the issuer of the payment device.

Alternately or additionally, the network operator may identifying a subset of transaction requests in the transaction clearing record to be compared to the database based upon at least a part of the data identifying the payment device.

Alternately or additionally, the network operator may append a supplement to the transaction data, the presence of which indicates to the issuing entity that the comparing was performed. The supplement may be further related to the result of the determining if a match exists in the database.

Optionally according to the present disclosure, performing the data substitution further comprises appending the data identifying the merchant included with the transaction request to the transaction request having the substituted cleansed merchant data.

Optionally, making a determination that the data identifying the merchant in the transaction request should not be substituted with the matching cleansed merchant data entry where the data identifying the merchant in the transaction request is a complete match with the corresponding cleansed merchant data entry.

Alternately or additionally, the network operator may receive a chargeback request from an issuer pertaining to a cleared transaction request, and determine whether the data identifying the merchant in the cleared transaction request had been substituted with the matching cleansed merchant data entry. In response to determining affirmatively that the data identifying the merchant in the cleared transaction request had been substituted with the matching cleansed merchant data entry, the network operator may reverse the substitution. The chargeback request is forwarded to the acquirer of the cleared transaction.

Alternately or additionally, the network operator may determine whether the transaction should be excluded from comparing the data identifying the merchant to a database including cleansed merchant data entries to determine if a match exists in the database based upon a predetermined characteristic of the merchant. The predetermined characteristic of the merchant includes the merchant's country.

The present disclosure further provides for a computer-readable storage medium having a program of instructions thereon which, when executed by a processor of a computer system, cause the processor to perform the steps according to the method described above and further herein. The present disclosure further provides for a system for intermediating cashless transactions from an acquirer involving a payment device issued by an issuer. The system includes a computing device having a processor, and a storage medium having a program of instructions thereon which, when executed by the processor, cause the processor to perform the steps according to the method described above and further herein.

These and other purposes, goals and advantages of the present disclosure will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings, in which like reference numerals refer to like structures across the several views, and wherein.

DETAILED DESCRIPTION

Figure 1:
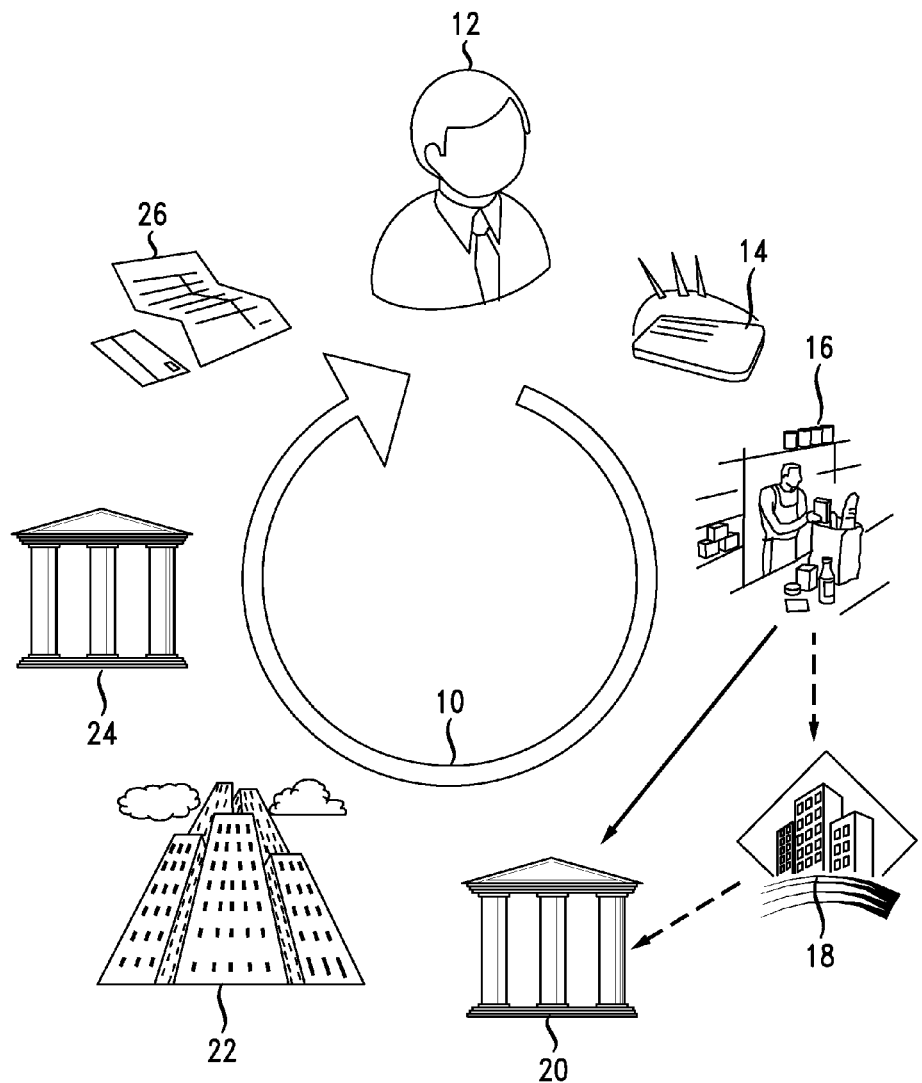
FIG. 1 illustrates a cycle for cashless transaction processing.

The process described and depicted herein may require that the issuer 24 had affirmatively enrolled in a cleansed merchant data program with the network operator 22. This is so because operation of the cleansed merchant data program may involve deviations from the data formatting protocols that were previously established, and will remain in effect with respect to those issuers not participating in the cleansed merchant data program, subject of course to routine and unrelated revisions in the future course of the parties' business. Enrollment may include a request to enroll by or on behalf of the issuer 24, and an acceptance by the issuer 24 of terms and conditions of participation in the cleansed merchant data program.

In response to the enrollment request by the issuer 24 and as part of the acceptance of that request by the network operator 22, the issuer 24 may be permitted to select some or all of Interbank Card Association (ICA) numbers and/or Bank Identification Numbers (BIN) associated with that issuer 24, and which make up part of an account number assigned to the payment device 14 issued to a device holder 12. This information can be considered to form some part of the transaction data that identifies the payment device in this or other embodiments of the instant disclosure. In this way, the network operator 22 can refer to the selection of ICA/BIN, for example via a lookup table, in the ordinary course of processing merchant 16/acquierer 20 transaction requests in order to determine whether to invoke the cleansed merchant data program for any particular transaction.

Figure 2:
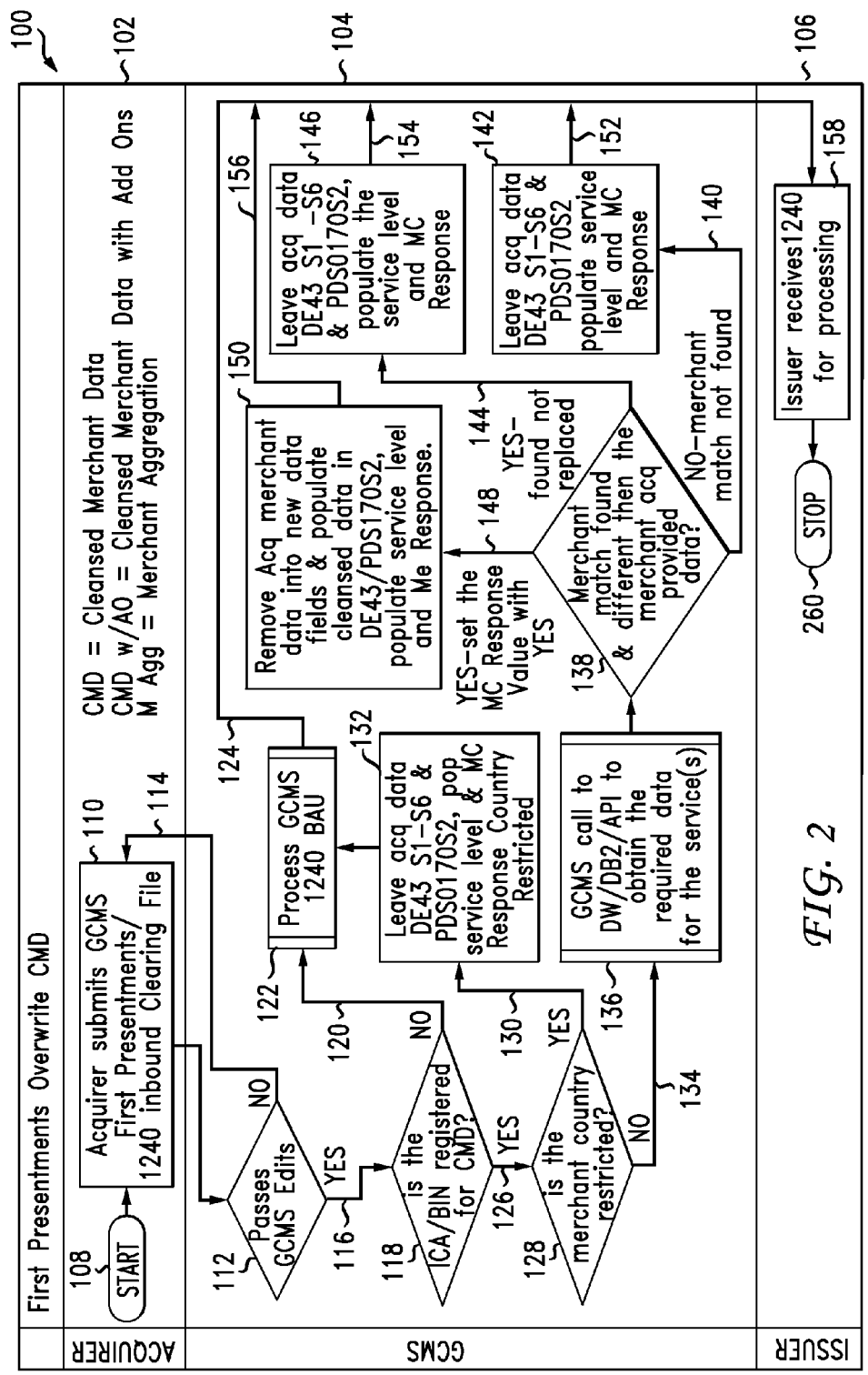
FIG. 2 illustrates a flowchart depicting the process for implementing merchant data cleansing according to a first embodiment of the instant disclosure.

Referring now to FIG. 2, illustrated is a flowchart, generally 100, describing the process for implementing merchant data cleansing according to a first embodiment of the instant disclosure. The flowchart 100 is divined into three vertical layers, a first layer 102 representing actions of the acquirer 20, a second and intermediate layer 104 representing the actions of a network operator 22, and a third layer 106 representing the actions of an issuer 24. An acquirer 20 begins the process 108 and submits 110 to the network operator 22 their first presentments of completed transactions in an inbound clearing file to clear the transactions. The network operator 22 checks the submission for conformance with its standards 112. If found out of compliance it is rejected and returned 114 to the acquirer 20. If found in compliance, the process proceeds 116.

The network operator 20 next determines at 118 whether the ICA and/or BIN derived from the payment device 14 that is associated with any particular transaction among those submitted for clearing 110 is previously registered for participation in the cleansed merchant data program. If the ICA and/or BIN is not found to be registered for the cleansed merchant data program 120, then the transaction is processed normally at 122, i.e., without invoking the features of the cleansed merchant data program. The normally processed transaction is then forwarded 124 onto the issuer 24.

On the other hand, upon determining that the ICA and/or BIN in question is registered for the cleansed merchant data program 126, a merchant check is performed 128. It may be the case that certain merchants are excluded from consideration and/or participation in the cleansed merchant data program. This exclusion may be individual or by some category or class. The exclusion may be voluntary, or imposed by applicable law or regulation. For example, certain countries may restrict by law operations by network operators 22 which may be considered to be of the type described herein. If the merchant check 128 indicates that the cleansed merchant data may not be invoked for that reason, then the transaction is routed 130 for further processing 132 in connection with the decision.

Among the further processing 132, the network operator 22 will leave in place the transaction data supplied by the acquirer 20, which was to have been eligible for replacement or supplementation in accordance with the cleansed merchant data program. The further processing 132 may further supplement the transaction to data to indicate to the issuer 24 that the application of the cleansed merchant data program to that transaction was suspended. This supplemental indication may include a reason for the suspension of the cleansed merchant data program for that transaction, for example if the cleansed merchant data program is inapplicable to transactions associated with merchants in a particular country. Transactions of this type which would have been processed under the cleansed merchant data program based upon ICA and/or BIN 118, but for restriction based upon the identity of the merchant 128, are thereafter processed 122 using the merchant data supplied by the acquirer 20, and forwarded 124 to the issuer 24.

In addition to or in substitution for the determination 118 where an ICA and/or BIN is used to invoke the merchant data cleansing program, other characteristics of the transaction may be used to identify transaction which are to be handled according to the merchant data cleansing program. For example, the program described herein is equally applicable to ACH transactions, which are generally distinguished from payment-card transactions in their handling. In such a case, the ACH transactions may be identified according to a bank Routing Transit Number (RTN) associated with the bank holding the account on which ACH transaction funds are drawn, analogous to the inspection of ISA and/or BIN numbers associated with a payment card transaction. In that way, the RTN may form at least a part of the transaction data that identifies the payment device, i.e., a physical check converted to ACH transaction as is presently known, and/or an ACH transaction considered as a virtual check which forms the payment device, and/or the account identified including the RTN as the payment device.

Alternately or additionally, it is contemplated within the scope of the instant disclosure that an entity upstream of the network operator 22 in the transaction handling process 10, for example the acquirer 20, may provide the transaction request submitted to the network operator with a predetermined characteristic that is meant to signal to the network operator 22 to invoke the merchant data cleansing process. For example, identifying information (a flag) may be appended to the transaction data before submission of the transaction request to the network operator for processing. In that case, the determination 118 will be an inspection of the transaction request for this flag or other predetermined characteristic. This method has the benefit of permitting the acquirer 20 or other upstream entity to selectively invoke the merchant data cleansing process.

Upon determining that a transaction is eligible for processing under the cleansed merchant data program based upon the merchant identity 128, the transaction is forwarded 134 to invoke the cleansed merchant data process 136. The cleansed merchant data process looks to an pre-established cleansed merchant database, including cleansed merchant data, i.e., merchant identification data that may be empirically verified and/or formatted according to a more identifiable and or useful standard from the perspective of the issuer 24 and/or the device holder 12.

Cleansed merchant data may include, without limitation, cleansed versions of the merchant's "Doing Business As" (or DBA) name, which is a trade name by which the business is known to its customers irrespective of its legal entity name; the merchant's street address; the merchant's city; the merchant's postal code; the merchant's state; the merchant's country. These fields correspond to the set of data fields typically included among transaction data supplied by an acquirer 20. According to the present disclosure, the cleansed data fields will be formatted to a defined standard, including abbreviations, etc. Cleansed data field may also include data that is verified as accurate, even though such cleansed data may differ from the merchant data supplied by the acquirer 20. Some or all of the cleansed data fields may exist for a given merchant. The fields that are replaced according to the present disclosure may be indicated to the issuer 24 according to further embodiments of the present disclosure.

A determination is made 138 whether a match exists in the merchant database that corresponds with the merchant information included in the transaction data supplied by the acquirer 20. The process of determining whether a match exists 138 may also include a supplemental determination whether the merchant data supplied by the acquirer 20 is to be replaced, based upon criteria to be described hereinafter.

If no match exists between the merchant data included in the transaction and the cleansed merchant database 140, the transaction is processed at 142 by leaving the merchant data supplied by the acquirer 20 in place. Optionally, the transaction data may be supplemented indicate or confirm that the merchant data cleansing program service has been applied to the transaction. Still further, optionally or additionally, the supplemental data may indicate the absence of a corresponding match in the cleansed merchant database.

It may be the case that a match is found between the merchant data supplied by the acquirer 20 in the transaction data and the cleansed merchant database. Notwithstanding, one or more reasons to be described hereinafter may indicate that the merchant data is not replaced 144. On such reason would be that the merchant data included with the transaction data provided by the acquirer 20 is a complete match to the merchant data in the cleansed merchant database. In that case, the transaction is processed at 146 by leaving the merchant data supplied by the acquirer 22 in place. Optionally, the transaction data may be supplemented indicate or confirm that the merchant data cleansing program service has been applied to the transaction. Still further, optionally or additionally, the supplemental data may indicate the presence of a corresponding match in the cleansed merchant database, and/or that it corresponds to the merchant data provided by the acquirer 20.

Furthermore, in the case that a match is found between the merchant data supplied by the acquirer 20 in the transaction data and the cleansed merchant database, and further that the merchant data supplied by the acquirer 20 with the transaction data is to be replaced 148. In that case, the transaction is processed 150 by replacing the merchant data supplied by the acquirer 22 with the corresponding. Optionally, the transaction data may be supplemented indicate or confirm that the merchant data cleansing program service has been applied to the transaction. Still further, optionally or additionally, the supplemental data may indicate the presence of a corresponding match in the cleansed merchant database, that some of all of the merchant data has been substituted, specifically which fields, and/or include the original merchant data provided by the acquirer 20 in addition to the cleansed merchant data.

Under any of the three processing scenarios 142, 146 or 150 described above, the transaction processing then proceeds via one of 152, 154 or 156, respectively, to deliver the transaction data to the issuer. The issuer receives the clearing data 158, possibly including the cleansed merchant data and/or supplemental data as described above. Thereafter, the merchant data cleansing process according to the first embodiment of the present disclosure is considered terminated 160.

Figure 3:
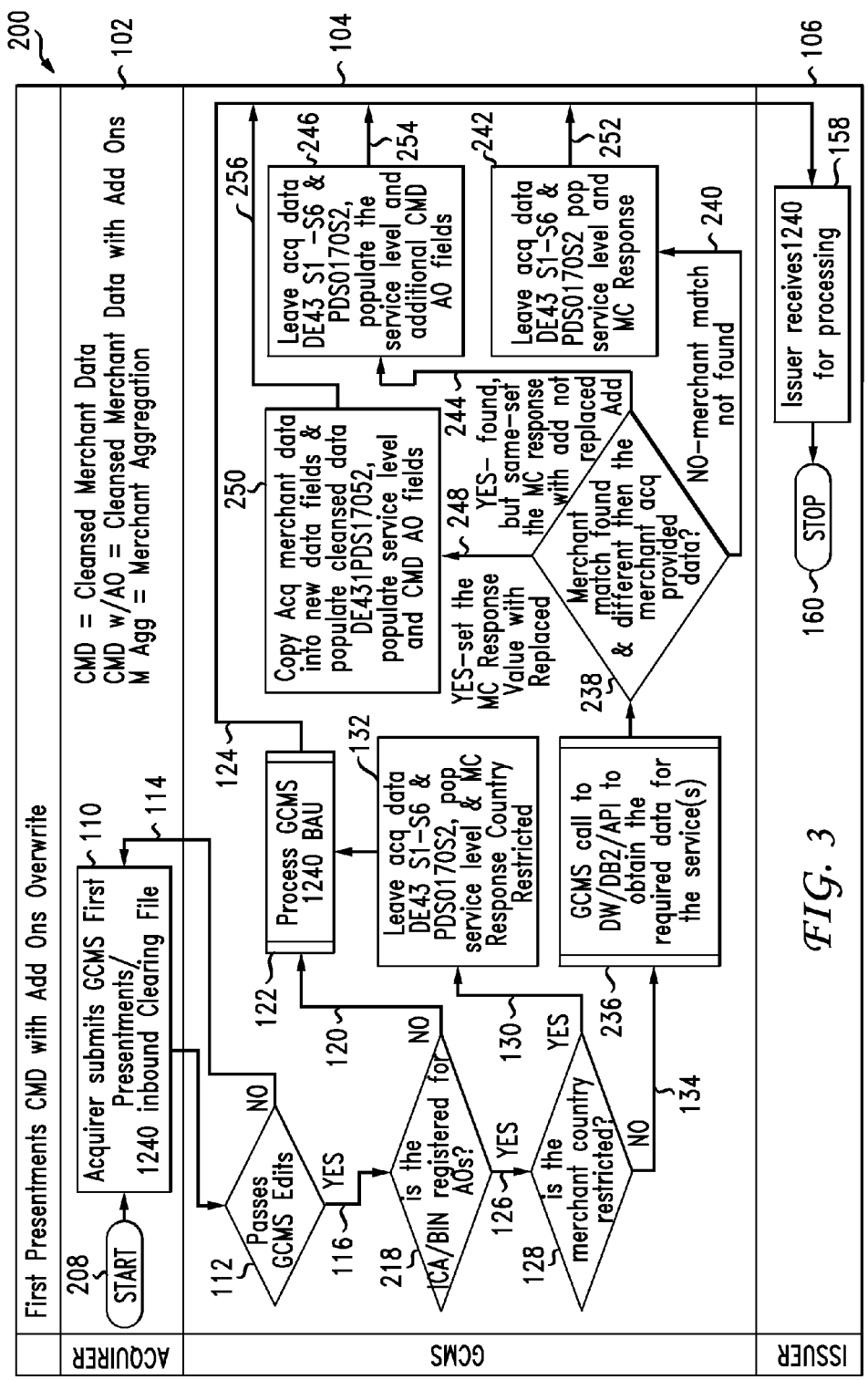
FIG. 3 illustrates a flowchart depicting the process for implementing merchant data cleansing according to a second embodiment of the instant disclosure.

Turning now to FIG. 3, illustrated is a flowchart, generally 200, describing the process for implementing merchant data cleansing according to a second embodiment of the instant disclosure. Where the second embodiment is the same as or similar to the first, like reference numerals appear in FIG. 3 as in FIG. 2, and a complete description of these features will be omitted, for the sake of brevity and in light of the foregoing full description.

As a matter of nomenclature, the second embodiment includes so-called "add-on" data with the cleansed merchant data. Add-on data is data that does not merely replace the merchant data provided by the acquirer 20 in the transaction data with more palatable form or content of cleansed merchant data. Add-on data is data specific to the merchant that would not have been included in the transaction clearing record according to present standards, but is nonetheless useful or valuable to the issuer. Add-on data may include, without limitation: a legal entity name of the merchant (contrasted with the merchant's DBA name); a relative percentage source of the merchant's sales, for example whether they originate in retail stores (aka, brick-and-mortar, or simply brick), on the internet or online, and any other sales channels; merchant URL.

From the beginning of the second embodiment process 208, the second embodiment deviates from the first embodiment of the present disclosure in that the verification of ICA and/or BIN 218 of an incoming transaction will be against a separate list as compared with the first embodiment. This permits the network operator 22 to simultaneously offer multiple levels of the merchant data cleansing service to various issuer 24 clients, or to different subsets of ICA and/or BIN number ranges associated with a single issuer 24 client, even simultaneously.

Upon determining that a transaction is eligible for processing under the merchant data cleansing program with add-on data based upon the merchant identity 128, the transaction is forwarded 134 to invoke the merchant data cleansing process including add-on data 236. The merchant data cleansing process looks to an pre-established cleansed merchant database, further including add-on data of the type described above, among other pertinent merchant-specific add-on data.

A determination is made 238 whether a match exists in the merchant database that corresponds with the merchant information included in the transaction data supplied by the acquirer 20. The process of determining whether a match exists 238 may also include a supplemental determination whether the merchant data supplied by the acquirer 20 is to be replaced, based upon criteria to be described hereinafter.

If no match exists between the merchant data included in the transaction and the cleansed merchant database 240, the transaction is processed at 242 by leaving the merchant data supplied by the acquirer 20 in place. Optionally, the transaction data may be supplemented indicate or confirm that the merchant data cleansing program service has been applied to the transaction. Still further, optionally or additionally, the supplemental data may indicate the absence of a corresponding match in the cleansed merchant database.

It may be the case that a match is found between the merchant data supplied by the acquirer 20 in the transaction data and the cleansed merchant database. Notwithstanding, one or more reasons to be described hereinafter may indicate that the merchant data is not replaced 244. On such reason would be that the merchant data included with the transaction data provided by the acquirer 20 is a complete match to the merchant data in the cleansed merchant database. In that case, according to the second embodiment, the transaction is processed at 246 by leaving the merchant data supplied by the acquirer 22 in place, while appending the add-on data. Optionally, the transaction data may be supplemented indicate or confirm that the merchant data cleansing program with add-on service has been applied to the transaction. Still further, optionally or additionally, the supplemental data may indicate the presence of a corresponding match in the cleansed merchant database, and/or that the cleansed merchant data corresponds to the merchant data provided by the acquirer 20. In connection with the indication of add-on service level applied, and the presence of add-on data, the issuer will be aware that merchant data was verified against the cleansed merchant database, and that the add-on service was provided.

Furthermore, in the case that a match is found between the merchant data supplied by the acquirer 20 in the transaction data and the cleansed merchant database, and further that the merchant data supplied by the acquirer 20 with the transaction data is to be replaced 248. In that case, the transaction is processed 250 by replacing the merchant data supplied by the acquirer 22 with the corresponding cleansed merchant data, and appending the add-on data. Optionally, the transaction data may be supplemented indicate or confirm that the merchant data cleansing program service has been applied to the transaction. Still further, optionally or additionally, the supplemental data may indicate the presence of a corresponding match in the cleansed merchant database, that some of all of the merchant data has been substituted, specifically which fields, and/or include the original merchant data provided by the acquirer 20 in addition to the cleansed merchant data.

It may further be the case that a match between the merchant data supplied by the acquirer 20 the cleansed merchant data exists, and possibly the two fully correspond, however, no supplemental add-on data is available. In this case, the transaction may be handled as described above with respect to the first embodiment in either of those cases, with the optional exception that the data may be supplemented to indicate the level of service applied, i.e., merchant data cleansing program with add-on, but the absence of add-on data produced the result subsequently transmitted to the issuer 24.

Under any of the processing scenarios of the second embodiment, including 242, 246 or 250 described above, the transaction processing then proceeds via one of 252, 254 or 256, respectively, to deliver the transaction data to the issuer. The issuer receives the clearing data 158, possibly including the cleansed merchant data, supplemental data and/or add-on data as described above according to this second embodiment. Thereafter, the merchant data cleansing process according to the second embodiment of the present disclosure is considered terminated 260.

Moreover, it is presently contemplated that the second embodiment as described will include and incorporate all features of the first embodiment, however this is not necessarily required to be the case. The network operator may find it advantageous to offer the add-on data service separate and apart from the merchant data cleansing service.

Figure 4:
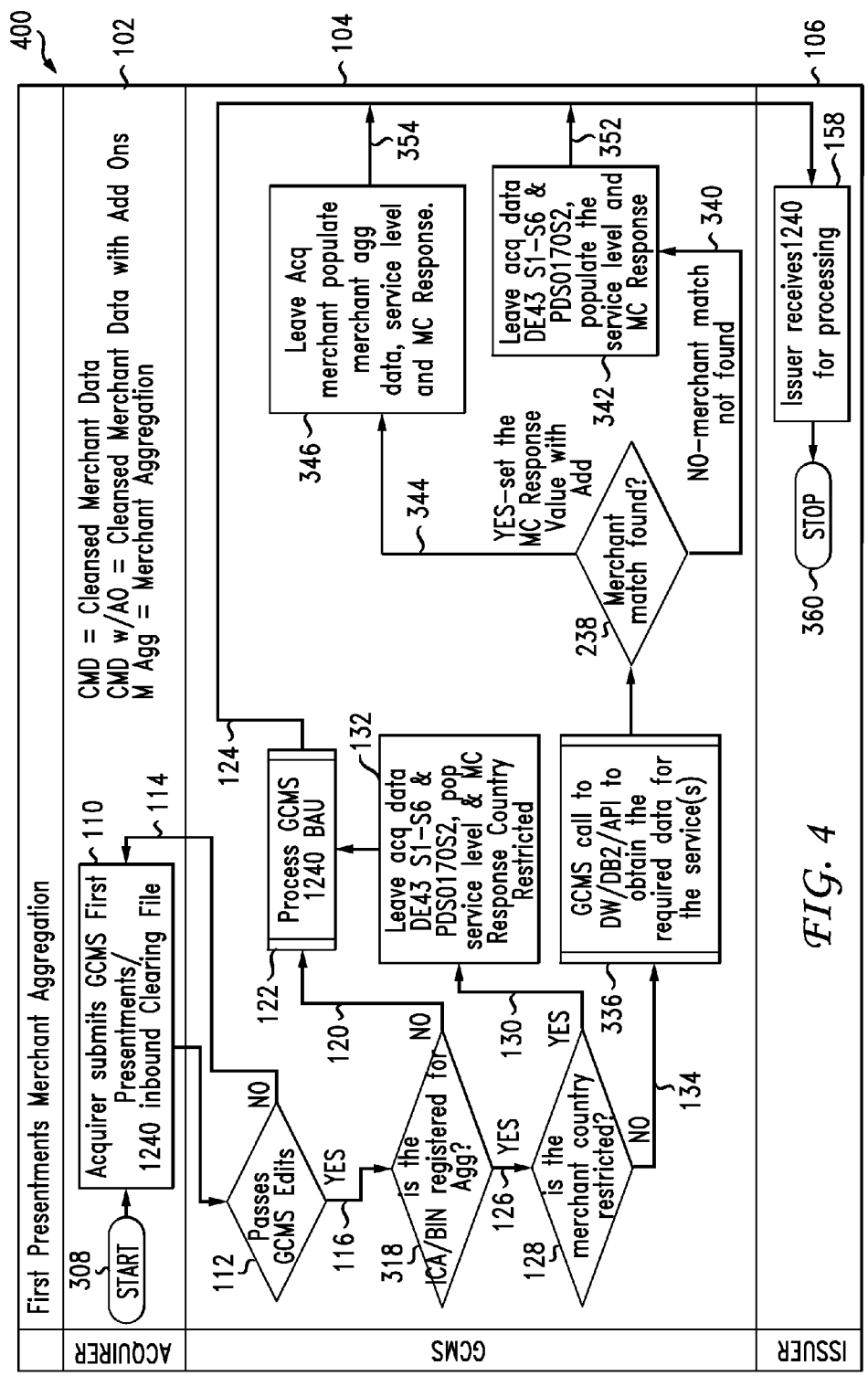
FIG. 4 illustrates a flowchart depicting the process for implementing merchant data cleansing according to a third embodiment of the instant disclosure.

Turning now to FIG. 4, illustrated is a flowchart, generally 300, describing the process for implementing merchant data cleansing according to a third embodiment of the instant disclosure. Where the third embodiment is the same as or similar to the first or second, like reference numerals appear in FIG. 4 as in FIG. 2 or 3, and a complete description of these features will be omitted, for the sake of brevity and in light of the foregoing full description.

As a matter of nomenclature, the third embodiment includes so-called "Merchant Aggregation" data with the cleansed merchant data. Merchant aggregation data is data that does not replace the merchant data provided by the acquirer 20 in the transaction data with more palatable form or content of cleansed merchant data. Merchant aggregation data is data related to the merchant when considered in the aggregate, i.e., data that is beyond the scope of information concerning the particular merchant where the transaction is consummated, and more particularly where that merchant is part of a larger aggregation (e.g., chain or franchise). Merchant aggregation would not have been included in the transaction clearing record according to present standards, but is nonetheless useful or valuable to the issuer. Merchant aggregation data may include, without limitation: An identifier of the aggregate merchant concern; the name of the aggregate merchant concern; an industry code related to the line of business in which the aggregate merchant operates; a super-industry code related to a broad classification in which the industry code operates; an identifier related to whether the aggregate merchant is a key aggregate merchant to be identified based on a specified criteria; a channels of distribution code indicating which channels of distribution are utilized by the aggregate merchant and optionally the relative proportions of the aggregate merchant's sales in each of those channels; a North American Industry Classification System (NAICS) code corresponding to the aggregate merchant; an Australian and New Zealand Standard Industrial Classification (ANZSIC) code related to an aggregate merchant; any public classification system identification code related to the aggregate merchant, or a parent aggregate merchant identifier where the aggregate merchant is itself under the auspices of a parent entity.

From the beginning of the third embodiment process 308, the third embodiment deviates from the first embodiment of the present disclosure in that the verification of ICA and/or BIN 318 of an incoming transaction will be against a separate list as compared with the first or second embodiments. This permits the network operator 22 to simultaneously offer multiple levels of the service to various issuer 24 clients, or to different subsets of ICA and/or BIN number ranges associated with a single issuer 24 client, even simultaneously.

Upon determining that a transaction is eligible for processing under the merchant data cleansing program with add-on data based upon the merchant identity 128, the transaction is forwarded 134 to invoke the merchant data cleansing process including merchant aggregation data 336. The merchant aggregation data process looks to an pre-established merchant aggregation database, further including merchant aggregation data, for example including the type described above, among other pertinent aggregate merchant-specific data.

A determination is made 338 whether a match exists in the aggregate merchant database that corresponds with the merchant information included in the transaction data supplied by the acquirer 20. If no match exists between the merchant data included in the transaction and the aggregate merchant database 340, the transaction is processed at 342 by leaving the merchant data supplied by the acquirer 20 in place. Optionally, the transaction data may be supplemented indicate or confirm that the aggregate merchant data program service has been applied to the transaction. Still further, optionally or additionally, the supplemental data may indicate the absence of a corresponding match in the aggregate merchant database.

Where a match is found between the merchant data supplied by the acquirer 20 in the transaction data and the aggregate merchant database 344, the transaction is processed at 346 by leaving the merchant data supplied by the acquirer 22 in place, while appending the aggregate merchant data. Optionally, the transaction data may be supplemented indicate or confirm that the aggregate merchant data program has been applied to the transaction. Still further, optionally or additionally, the supplemental data may indicate the presence of a corresponding match in the aggregate merchant database, and/or that the cleansed merchant data corresponds to the merchant data provided by the acquirer 20. In connection with the indication of add-on service level applied, and the presence of add-on data, the issuer will be aware that merchant data was verified against the cleansed merchant database, and that the aggregate merchant service was provided.

Furthermore, in the case that a match is found between the merchant data supplied by the acquirer 20 in the transaction data and the cleansed merchant database, and further that the merchant data supplied by the acquirer 20 with the transaction data is to be replaced 248. In that case, the transaction is processed 250 by replacing the merchant data supplied by the acquirer 22 with the corresponding cleansed merchant data, and appending the add-on data. Optionally, the transaction data may be supplemented indicate or confirm that the merchant data cleansing program service has been applied to the transaction. Still further, optionally or additionally, the supplemental data may indicate the presence of a corresponding match in the cleansed merchant database, that some of all of the merchant data has been substituted, specifically which fields, and/or include the original merchant data provided by the acquirer 20 in addition to the cleansed merchant data.

Under any of the processing scenarios of the third embodiment, including 342 or 246 described above, the transaction processing then proceeds via one of 352 or 254, respectively, to deliver the transaction data to the issuer. The issuer receives the clearing data 158, possibly including the merchant data, supplemental data and/or merchant aggregation data as described above. Thereafter, the merchant data cleansing process according to the second embodiment of the present disclosure is considered terminated 260.

Moreover, it is presently contemplated and described above that the third embodiment may operate largely independently of the first and/or second, i.e., there is no express consideration of merchant data cleansing, verification, and/or substitution. All features of the first or second embodiments, therefore, are not necessarily required to operation of the third embodiment. The network operator 22 may find it advantageous to offer the merchant aggregation data service separate and apart from the merchant data cleansing and/or add-on data services. However, the levels of service described above by way of the various and/or multiple embodiments are in no way mutually exclusive, and they may be combined in whole or in any constituent part.

Figure 5:
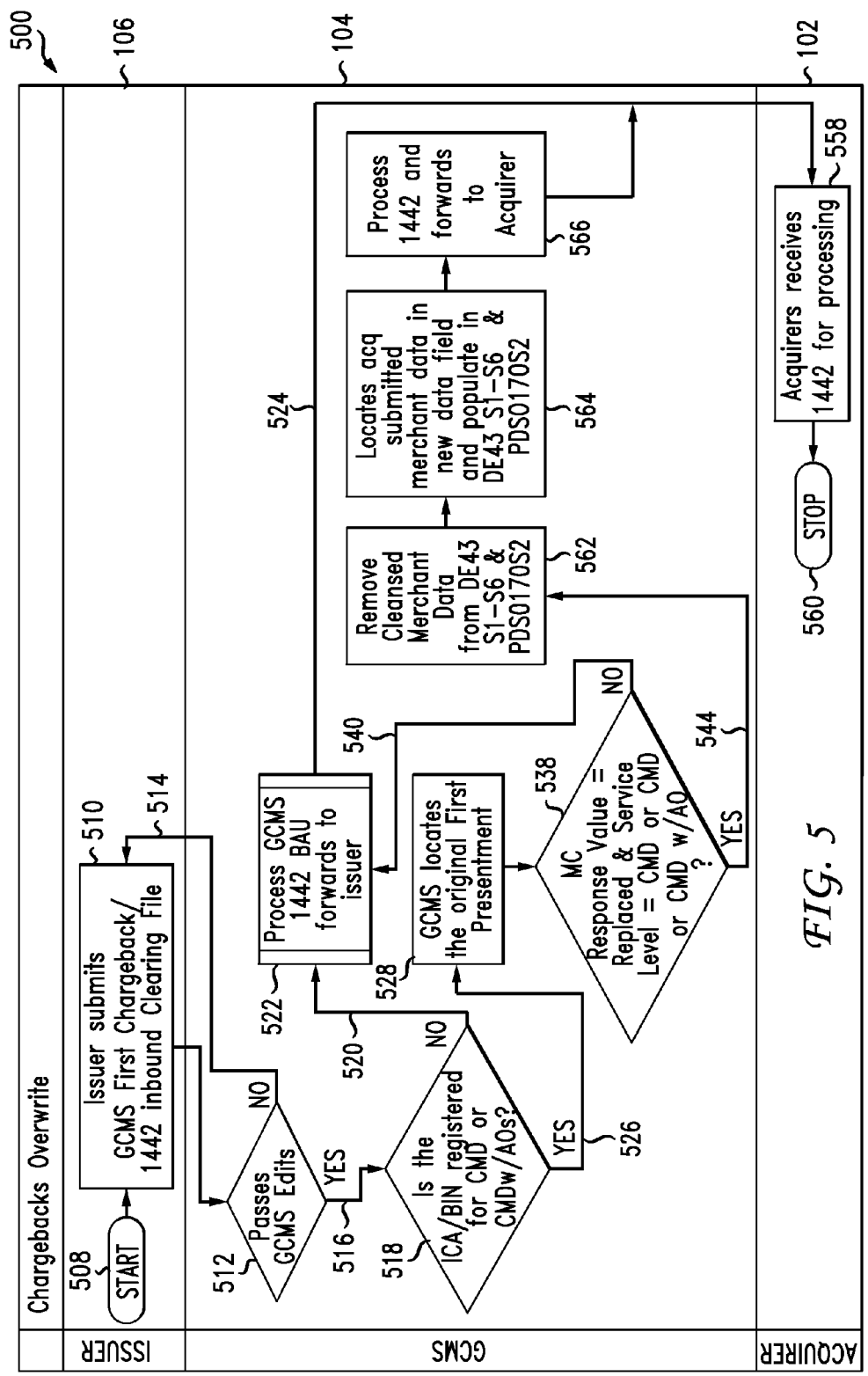
FIG. 5 illustrates a flow chart depicting a chargeback procedure according to the present disclosure.

Turning now to FIG. 5, illustrated is a flow chart, generally 500, for a chargeback procedure according to the present disclosure. A chargeback is the process by which an issuer 24 disputes the validity of a transaction, often at the behest of the device holder 12 and/or a party having financial ownership or responsibility for the account(s) funding the payment device 14, if not solely the device holder 12, and often concerning quality or non-delivery of goods or services purchased using the device transaction. The chargeback flowchart is again vertically divided into sections 106, 104 and 102, representing respective actions undertaken by the issuer 24, network operator 22 and acquirer 20, respectively. These vertical divisions are in a reverse order as compared to FIGS. 2-4, in part because the chargeback is initiated by the issuer 24, which was generally the reverse of the flow directions, as between the respective parties, depicted in FIGS. 2-4.

The issuer 24 initiates a chargeback 508, and submits the chargeback message 510. The network operator 22 checks the submission for conformance with its standards 512. If found out of compliance, it is rejected and returned 514 to the issuer 24. If found in compliance, the process proceeds 516. The network operator 20 next determines at 518 whether the ICA and/or BIN derived from the payment device 14 that is identified in or associated with the chargeback request is registered for participation in the merchant data cleansing program, with or without add-on or merchant aggregation data. If the ICA and/or BIN is not found to be registered for the merchant data cleansing program 520, then the chargeback is processed normally at 522, i.e., without invoking the features of the merchant data cleansing program. The normally processed chargeback is then forwarded 524 onto the issuer 24.

On the other hand, upon determining that the ICA and/or BIN in question is registered for the merchant data cleansing program 526, the network operator searches its records for the original or first presentment of the underlying transaction. With reference to the original presentment of the transaction underlying the chargeback request message, the network operator 22 determines whether the merchant data was substituted by application of the merchant data cleansing program 538, whether with or without add-on or merchant aggregation data applied. If the merchant data was not substituted for the underlying transaction 540, then the chargeback request of processed normally 522, and routed 524 to the acquirer 20.

On the other hand, if it is determined that the merchant data cleansing program has been applied 544, the application of the cleansed merchant data should be reversed, at least so that the merchant data in the chargeback request will correspond to the merchant data submitted by the acquirer 20 in the first instance. Towards accomplishing this, the cleansed merchant data that had been substituted in the transaction is removed from the chargeback request message 562. The merchant information submitted by the acquirer 20 in the original presentment of the transaction clearing record is then re-populated in the applicable merchant data fields 564. Having restored the merchant data to its original state and thus immediately recognizable to the acquirer 20, the chargeback request of forwarded 566 on to the acquirer 20. The issuer receives the chargeback data 558, including the original merchant data as submitted with the initial transaction. Thereafter, the chargeback process according to the present disclosure is considered terminated 560.

The foregoing processes have been described with reference what it known in the industry as a dual-message acquirer. This term is used to describe what most consumer understand as a credit transaction. The dual-message process is also applicable to offline debit transactions. On the other hand, there also exists a single-message transaction (aka Single Message System or alternately MDS), typically involving a debit card linked to or drawing from a demand deposit account in an online transaction. In that case, the transaction is authorized by a PIN number input by the device holder 12, optionally in addition to a signature. A dual-message transaction involves, as the name suggests, two messages to complete a transaction; a single-message only one. However, the application of the merchant data cleansing program and/or optionally supplemental, add-on or merchant aggregation data is not substantively affected by the use of either single- or dual-message protocol, nor the involvement of a merchant data service provider as intermediary between the network operator 22 and the issuer 24.

It will be appreciated by those skilled in the art that the cleansed merchant data, add-on data and/or merchant aggregation data as described above may be operated by a machine operator having a suitable interface mechanism, and/or more typically in an automated manner, for example by operation of a network-enabled computer system including a processor executing a system of instructions stored on a machine-readable medium, RAM, hard disk drive, or the like. The instructions will cause the processor to operate in accordance with the present disclosure.

Figure 6:
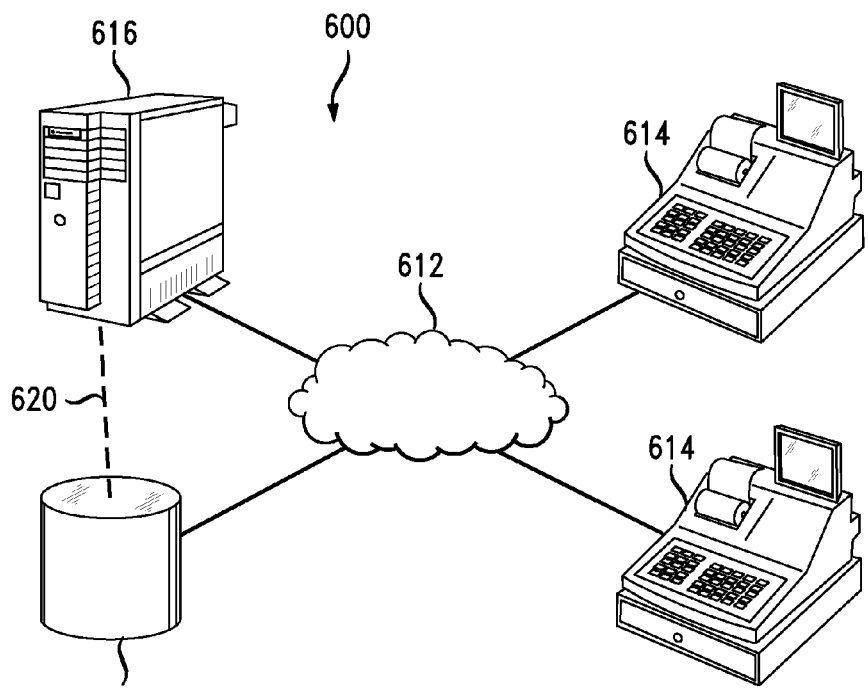
FIG. 6 illustrates a network-enabled system according to a further embodiment of the present disclosure.

Turning then to FIG. 6, illustrated is a network-enabled system, generally 600, as a further embodiment of the present disclosure. A telecommunication network 612 enables information exchange among the various components of the system. Network 12 may comprise an Internet, an intranet, Ethernet, virtual private network (VPN), cellular, WiFi, or substantially any means or modality by which telecommunication machines, or components thereof, exchange data or information with each other. The network 612 may comprise a composite of several different of these or other telecommunication modes. The network 612 may connect components that are physically co-located, for example a computer or processing device that shares an internal databus (e.g., PCI, SATA) with one or more storage means.

Point-of-sale 614 represents the point of origination of a transaction, whether tangible (e.g., brick-and-mortar or other location), internet-based, as in an e-commerce transaction regardless of the physical location of the device holder 12 or the merchant 16. Point of sale 614 for the purposes of FIG. 6 further includes any intermediaries (third party payment provider 18, acquirer 20, etc.) as may be necessary to deliver the transaction data to the network operator 22.

Figure 7:
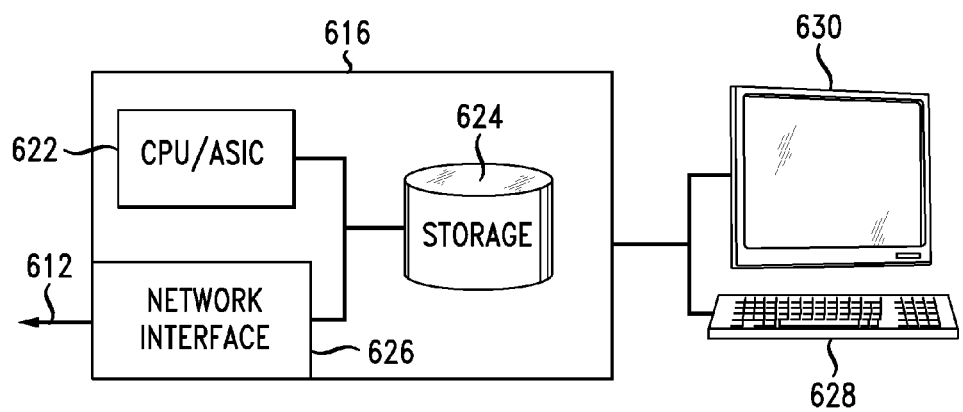
FIG. 7 illustrates schematically a representative server of the system.

Network operator 22 maintains operational control of a server 616 including a processing device 622 for carrying out transaction processing and optionally storage 624 maintaining instructions executable by the processor (See, FIG. 7). Network operator 22 also maintain access between the transaction processing server 616 and a database 618 or other suitable means for storage of merchant information. The database 618 includes cleansed merchant data entries, merchant add-on information entries, and merchant aggregation entries. Server 616 and database 618 may each include plural, several, shared, divided and/or redundant machines as the network operator 22 finds necessary or convenient, including the necessary operational capacity to divide the processing of volumes of transactions and/or access to data entries among such plural, etc., machines. The dataflow connection between the server 616 and the database 618 may make use of the network 612, or employ a more direct connection 620.

FIG. 7 illustrates schematically a representative server 616 of the system 600. The server 616 includes at least a processor or CPU 622 which is operative to act on a program of instructions stored on a computer-readable medium 624. Execution of the program of instruction causes the processor to carry out, for example, the methods described above according to the various embodiments. It may further or alternately be the case that the processor 622 comprises application-specific circuitry including the operative capability to execute the prescribed operations integrated therein. The server 616 includes a network interface 626 for communication with the network 612. Optionally or additionally, a data entry device 628 (e.g., keyboard, mouse, trackball, pointer, etc.) facilitates human interaction with the server, as does an optional display 630.

Variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A method of intermediating cashless transactions from an acquirer involving a payment device issued by an issuer, the method comprising:
   receiving a transaction request from the acquirer on behalf of a merchant in a transaction clearing record, the transaction request including data identifying the merchant and the payment device;
   searching a first database including cleansed merchant data entries to determine if a merchant entry exists in the first database corresponding with the data identifying the merchant included in the transaction request;
   in response to determining that a match exists in the first database between a cleansed merchant data entry and the data identifying the merchant in the transaction request, determining whether the data identifying the merchant in the transaction request should be substituted with the matching cleansed merchant data entry;

in response to determining that the data identifying the merchant should be substituted with the matching cleansed merchant data entry, performing the data substitution;

forwarding the transaction request including the substituted cleansed merchant data to the issuer of the payment device and soliciting payment on the transaction request including the substituted cleansed merchant data.

2. The method according to claim 1, further comprising:
searching a second database including merchant add-on data entries to determine if a merchant entry exists in the second database corresponding with the data identifying the merchant included in the transaction request;
in response to determining a match exists in the second database between a merchant add-on data entry and the data identifying the merchant in the transaction request, appending the merchant add-on data entry to the transaction request before forwarding the transaction request to the issuer of the payment device.

3. The method according to claim 2, wherein an add-on data entry comprises, for the corresponding merchant, one or more of a legal entity name of the merchant, a relative percentage source of the merchant's sales by sales channel, and a merchant URL.

4. The method according to claim 1, further comprising:
searching a third database including merchant aggregation data entries to determine if a merchant entry exists in the third database corresponding with the data identifying the merchant included in the transaction request;
in response to determining a match exists in the third database between a merchant aggregation data entry and the data identifying the merchant in the transaction request, appending the merchant aggregation data entry to the transaction request before forwarding the transaction request to the issuer of the payment device.

5. The method according to claim 4, wherein a merchant aggregation data entry comprises, for the corresponding merchant, one or more of an identifier of an aggregate merchant, the name of the aggregate merchant, an industry code related to the line of business in which the aggregate merchant operates, a super-industry code related to a broad classification the industry code, an identifier related to whether the aggregate merchant is a key aggregate merchant to be identified based on a specified criteria, a channels of distribution code related to the channels of distribution utilized by the aggregate merchant, relative proportions of the aggregate merchant's sales in each of the channels of distribution, a North American Industry Classification System (NAICS) code related to the aggregate merchant, an Australian and New Zealand Standard Industrial Classification (ANZSIC) code related to an aggregate merchant, a public classification systems code related to the aggregate merchant, and a parent aggregate merchant identifier related to a parent entity of the aggregate merchant.

6. The method according to claim 1, further comprising:
identifying a subset of transaction requests in the transaction clearing record to be compared to the database based upon at least one of (i) a part of the data identifying the payment device, and (ii) the presence of a predetermined characteristic of the transaction request received from the acquirer.

7. The method according to claim 1, further comprising:
appending a supplement to the transaction data, the presence of which indicate to the issuing entity that the comparing was performed.

8. The method according to claim 7, wherein the supplement is further related to the result of the determining if a match exists in the database.

9. The method according to claim 1, wherein performing the data substitution further comprises:
appending the data identifying the merchant included with the transaction request to the transaction request having the substituted cleansed merchant data.

10. The method according to claim 1, wherein making the determination that the data identifying the merchant in the transaction request should not be substituted with the matching cleansed merchant data entry where the data identifying the merchant in the transaction request is a complete match with the corresponding cleansed merchant data entry.

11. The method according to claim 1, further comprising:
determining whether the transaction should be excluded from comparing the data identifying the merchant to a database including cleansed merchant data entries to determine if a match exists in the database based upon a predetermined characteristic of the merchant.

12. The method according to claim 11, wherein the predetermined characteristic of the merchant includes the merchant's country.

13. A method of intermediating cashless transactions from an acquirer involving a payment device issued by an issuer, the method comprising:
receiving a transaction request from the acquirer on behalf of a merchant in a transaction clearing record, the transaction request including data identifying the merchant and the payment device;
searching a first database including cleansed merchant data entries to determine if a merchant entry exists in the first database matching the data identifying the merchant included in the transaction request;
in response to determining that a match exists in the first database between a cleansed merchant data entry and the data identifying the merchant in the transaction request, determining whether the data identifying the merchant in the transaction request should be substituted with the matching cleansed merchant data entry;
in response to determining that the data identifying the merchant should be substituted with the matching cleansed merchant data entry, performing the data substitution;
forwarding the transaction request to the issuer of the payment device and soliciting payment on the transaction request;
receiving a chargeback request from the of the payment device issuer pertaining to a cleared transaction request;
determining whether the data identifying the merchant in the cleared transaction request had been substituted with the matching cleansed merchant data entry;
in response to determining affirmatively that the data identifying the merchant in the cleared transaction request had been substituted with the matching cleansed merchant data entry, reversing the substitution; and
forwarding the chargeback request to the acquirer of the cleared transaction.

14. A system for intermediating cashless transactions from an acquirer involving a payment device issued by an issuer, the system comprising:
a processor; and
a computer-readable storage medium having a program of instruction thereon, which when executed by the processor cause the system to
receive a transaction request from the acquirer on behalf of a merchant in a transaction clearing record, the transaction request including data identifying the merchant and the payment device;

search a first database including cleansed merchant data entries to determine if a merchant entry exists in the database corresponding with the data identifying the merchant included in the transaction request;

in response to determining that a match exists in the first database between a cleansed merchant data entry and the data identifying the merchant in the transaction request, determine whether the data identifying the merchant in the transaction request should be substituted with the matching cleansed merchant data entry;

in response to determining that the data identifying the merchant should be substituted with the matching cleansed merchant data entry, perform the data substitution; and forward the transaction request including the substituted cleansed merchant data to the issuer of the payment device and soliciting payment on the transaction request including the substituted cleansed merchant data.

15. The system according to claim 14, wherein the program of instruction, when executed by the processor, further causes the system to:

search a second database including merchant add-on data entries to determine if a merchant entry exists in the second database corresponding with the data identifying the merchant included in the transaction request;

in response to determining a match exists in the second database between a merchant add-on data entry and the data identifying the merchant in the transaction request, append the merchant add-on data entry to the transaction request before forwarding the transaction request to the issuer of the payment device.

16. The system according to claim 15, wherein an add-on data entry comprises, for the corresponding merchant, one or more of a legal entity name of the merchant, a relative percentage source of the merchant's sales by sales channel, and a merchant URL.

17. The system according to claim 15, wherein the program of instruction, when executed by the processor, further causes the system to:

search a third database including merchant aggregation data entries to determine if a merchant entry exists in the third database corresponding with the data identifying the merchant included in the transaction request;

in response to determining a match exists in the third database between a merchant aggregation data entry and the data identifying the merchant in the transaction request, append the merchant aggregation data entry to the transaction request before forwarding the transaction request to the issuer of the payment device.

18. The system according to claim 17, wherein a merchant aggregation data entry comprises, for the corresponding merchant, one or more of an identifier of an aggregate merchant, the name of the aggregate merchant, an industry code related to the line of business in which the aggregate merchant operates, a super-industry code related to a broad classification the industry code, an identifier related to whether the aggregate merchant is a key aggregate merchant to be identified based on a specified criteria, a channels of distribution code related to the channels of distribution utilized by the aggregate merchant, relative proportions of the aggregate merchant's sales in each of the channels of distribution, a North American Industry Classification System (NAICS) code related to the aggregate merchant, an Australian and New Zealand Standard Industrial Classification (ANZSIC) code related to an aggregate merchant, a public classification systems code related to the aggregate merchant, and a parent aggregate merchant identifier related to a parent entity of the aggregate merchant.

19. The system according to claim 14, wherein the program of instruction, when executed by the processor, further causes the system to:

identify a subset of transaction requests in the transaction clearing record to be compared to the database based upon at least one of (i) a part of the data identifying the payment device, and (ii) the presence of a predetermined characteristic of the transaction request received from the acquirer.

20. The system according to claim 14, wherein the program of instruction, when executed by the processor, further causes the system to:

append a supplement to the transaction data, the presence of which indicates to the issuing entity that the comparing was performed.

21. The system according to claim 20, wherein the supplement is further related to the result of the determining if a match exists in the database.

22. The system according to claim 14, wherein performing the data substitution further comprises:

appending the data identifying the merchant included with the transaction request to the transaction request having the substituted cleansed merchant data.

23. The system according to claim 14, wherein the determination is made that the data identifying the merchant in the transaction request should not be substituted with the matching cleansed merchant data entry where the data identifying the merchant in the transaction request is a complete match with the corresponding cleansed merchant data entry.

24. The system according to claim 14, wherein the program of instruction, when executed by the processor, further causes the system to:

determine whether the transaction should be excluded from comparing the data identifying the merchant to a database including cleansed merchant data entries to determine if a match exists in the database based upon a predetermined characteristic of the merchant.

25. The system according to claim 24, wherein the predetermined characteristic of the merchant includes the merchant's country.

26. A system for intermediating cashless transactions from an acquirer involving a payment device issued by an issuer, the system comprising:

a processor; and a computer-readable storage medium having a program of instruction thereon, which when executed by the processor cause the system to:

receive a transaction request from the acquirer on behalf of a merchant in a transaction clearing record, the transaction request including data identifying the merchant and the payment device;

search a first database including cleansed merchant data entries to determine if a merchant entry exists in the database corresponding with the data identifying the merchant included in the transaction request;

in response to determining that a match exists in the first database between a cleansed merchant data entry and the data identifying the merchant in the transaction request, determine whether the data identifying the merchant in the transaction request should be substituted with the matching cleansed merchant data entry;

in response to determining that the data identifying the merchant should be substituted with the matching cleansed merchant data entry, perform the data substitution;

forward the transaction request including the substituted cleansed merchant data to the issuer of the payment device and soliciting payment on the transaction request;

receive a chargeback request from the issuer of the payment device pertaining to a cleared transaction request;

determine whether the data identifying the merchant in the cleared transaction request had been substituted with the matching cleansed merchant data entry;

in response to determining affirmatively that the data identifying the merchant in the cleared transaction request had been substituted with the matching cleansed merchant data entry, reverse the substitution; and forward the chargeback request to the acquirer of the cleared transaction.

27. A non-transitory computer-readable storage medium having a program of instruction thereon, which when executed by a processor cause the processor to:

receive a transaction request from the acquirer on behalf of a merchant in a transaction clearing record, the transaction request including data identifying the merchant and the payment device;

search a first database including cleansed merchant data entries to determine if a merchant entry exists in the first database corresponding with the data identifying the merchant included in the transaction request;

in response to determining a match exists in the first database between a cleansed merchant data entry and the data identifying the merchant in the transaction request, determine whether the data identifying the merchant in the transaction request should be substituted with the matching cleansed merchant data entry;

in response to determining that the data identifying the merchant should be substituted with the matching cleansed merchant data entry, perform the data substitution; and forward the transaction request including the substituted cleansed merchant data to the issuer of the payment device and soliciting payment on the transaction request including the substituted cleansed merchant data.

28. The medium according to claim 27, wherein the program of instruction, when executed by the processor, further causes the processor to:

search a second database including merchant add-on data entries to determine if a merchant entry exists in the database corresponding with the data identifying the merchant included in the transaction request;

in response to determining a match exists in the second database between a merchant add-on data entry and the data identifying the merchant in the transaction request, append the merchant add-on data entry to the transaction request before forwarding the transaction request to the issuer of the payment device.

29. The medium according to claim 28, wherein an add-on data entry comprises, for the corresponding merchant, one or more of a legal entity name of the merchant, a relative percentage source of the merchant's sales by sales channel, and a merchant URL.

30. The medium according to claim 27, wherein the program of instruction, when executed by the processor, further causes the processor to:

searching a third database including merchant aggregation data entries to determine if a merchant entry exists in the third database corresponding with the data identifying the merchant included in the transaction request;

in response to determining a match exists in the third database between a merchant aggregation data entry and the data identifying the merchant in the transaction request, append the merchant aggregation data entry to the transaction request before forwarding the transaction request to the issuer of the payment device.

31. The medium according to claim 30, wherein a merchant aggregation data entry comprises, for the corresponding merchant, one or more of an identifier of an aggregate merchant, the name of the aggregate merchant, an industry code related to the line of business in which the aggregate merchant operates, a super-industry code related to a broad classification the industry code, an identifier related to whether the aggregate merchant is a key aggregate merchant to be identified based on a specified criteria, a channels of distribution code related to the channels of distribution utilized by the aggregate merchant, relative proportions of the aggregate merchant's sales in each of the channels of distribution, a North American Industry Classification System (NAICS) code related to the aggregate merchant, an Australian and New Zealand Standard Industrial Classification (ANZSIC) code related to an aggregate merchant, a public classification systems code related to the aggregate merchant, and a parent aggregate merchant identifier related to a parent entity of the aggregate merchant.

32. The medium according to claim 27, wherein the program of instruction, when executed by the processor, further causes the processor to:

identify a subset of transaction requests in the transaction clearing record to be compared to the database based upon at least one of (i) a part of the data identifying the payment device, and (ii) the presence of a predetermined characteristic of the transaction request received from the acquirer.

33. The medium according to claim 27, wherein the program of instruction, when executed by the processor, further causes the processor to:

append a supplement to the transaction data, the presence of which indicates to the issuing entity that the comparing was performed.

34. The medium according to claim 33, wherein the supplement is further related to the result of the determining if a match exists in the database.

35. The medium according to claim 27, wherein performing the data substitution further comprises:

appending the data identifying the merchant included with the transaction request to the transaction request having the substituted cleansed merchant data.

36. The medium according to claim 27, wherein the determination is made that the data identifying the merchant in the transaction request should not be substituted with the matching cleansed merchant data entry where the data identifying the merchant in the transaction request is a complete match with the corresponding cleansed merchant data entry.

37. The medium according to claim 27, wherein the program of instruction, when executed by the processor, further causes the processor to:

determine whether the transaction should be excluded from comparing the data identifying the merchant to a database including cleansed merchant data entries to determine if a match exists in the database based upon a predetermined characteristic of the merchant.

38. The medium according to claim 37, wherein the predetermined characteristic of the merchant includes the merchant's country.

39. A non-transitory computer-readable storage medium having a program of instruction thereon, which when executed by a processor, cause the processor to:
- receive a transaction request from an acquirer on behalf of a merchant in a transaction clearing record, the transaction request including data identifying the merchant and a payment device;
- search a first database including cleansed merchant data entries to determine if a merchant entry exists in the first database corresponding with the data identifying the merchant included in the transaction request;
- in response to determining a match exists in the first database between a cleansed merchant data entry and the data identifying the merchant in the transaction request, determine whether the data identifying the merchant in the transaction request should be substituted with the matching cleansed merchant data entry;
- in response to determining that the data identifying the merchant should be substituted with the matching cleansed merchant data entry, perform the data substitution;
- forward the transaction request including the substituted cleansed merchant data to the issuer of the payment device;
- receive a chargeback request from the issuer of the payment device pertaining to a cleared transaction request;
- determine whether the data identifying the merchant in the cleared transaction request had been substituted with the matching cleansed merchant data entry;
- in response to determining that the data identifying the merchant in the cleared transaction request had been substituted with the matching cleansed merchant data entry, reverse the substitution; and
- forward the chargeback request to the acquirer of the cleared transaction.

\* \* \* \* \*